United States Patent
Jao

(10) Patent No.: US 8,509,143 B2
(45) Date of Patent: Aug. 13, 2013

(54) SYSTEM AND METHOD FOR MULTIPLEXING PDH AND PACKET DATA

(75) Inventor: Tjo San Jao, Beaconsfield (CA)

(73) Assignee: Harris Corporation, Melbourne, FL (US)

( * ) Notice: Subject to any disclaimer, the term of this patent is extended or adjusted under 35 U.S.C. 154(b) by 295 days.

(21) Appl. No.: 12/826,609

(22) Filed: Jun. 29, 2010

(65) Prior Publication Data
US 2010/0265969 A1  Oct. 21, 2010

Related U.S. Application Data

(62) Division of application No. 11/032,078, filed on Jan. 11, 2005, now Pat. No. 7,782,812.

(51) Int. Cl.
*H04B 7/212* (2006.01)
(52) U.S. Cl.
USPC .......................................................... 370/324
(58) Field of Classification Search
None
See application file for complete search history.

(56) References Cited

U.S. PATENT DOCUMENTS

| | | | |
|---|---|---|---|
| 4,667,324 A | 5/1987 | Graves | |
| 4,905,228 A | 2/1990 | Angell et al. | |
| 4,924,459 A | 5/1990 | Angell et al. | |
| 5,583,562 A | 12/1996 | Birch et al. | |
| 5,844,885 A | 12/1998 | Grob et al. | |
| 5,930,250 A | 7/1999 | Klok et al. | |
| 6,584,118 B1 | 6/2003 | Russell et al. | |
| 6,704,326 B2 | 3/2004 | Russell et al. | |
| 6,941,508 B2 * | 9/2005 | Abbott et al. | 715/203 |
| 7,298,808 B1 * | 11/2007 | Rey | 375/372 |
| 2001/0016023 A1 | 8/2001 | Roy et al. | |
| 2004/0003108 A1 | 1/2004 | Knapp et al. | |
| 2005/0122925 A1 * | 6/2005 | Chitre et al. | 370/310.1 |

FOREIGN PATENT DOCUMENTS

JP    2005-244328    9/2005

OTHER PUBLICATIONS

Japanese office action dated Mar. 2, 2010 for Japanese patent application 2007-551302 and English translation thereof, 5 pages.
Search Report and Written Opinion mailed Feb. 5, 2007 from International Serial No. PCT/US2006/000616 filed Jan. 10, 2006.
Office Action mailed Jan. 9, 2009 from U.S. Appl. No. 11/032,078, filed Jan. 11, 2005.
Office Action mailed Jul. 6, 2009 from U.S. Appl. No. 11/032,078, filed Jan. 11, 2005.
Notice of Allowance mailed Jan. 26, 2010 from U.S. Appl. No. 11/032,078, filed Jan. 11, 2005.

* cited by examiner

*Primary Examiner* — Raj Jain
(74) *Attorney, Agent, or Firm* — Sheppard, Mullin, Richter & Hampton LLP

(57) ABSTRACT

A method of efficiently combining data from at least a plurality of a first type of data source and a second type of data source. The method comprises synchronizing the plural first type of data sources to thereby generate a synchronized data rate, providing a frame having plural bit positions, assigning the synchronized first type of data in ones of the bit positions of the frame, and arranging the second type of data in the frame as a function of the synchronized data rate.

22 Claims, 3 Drawing Sheets

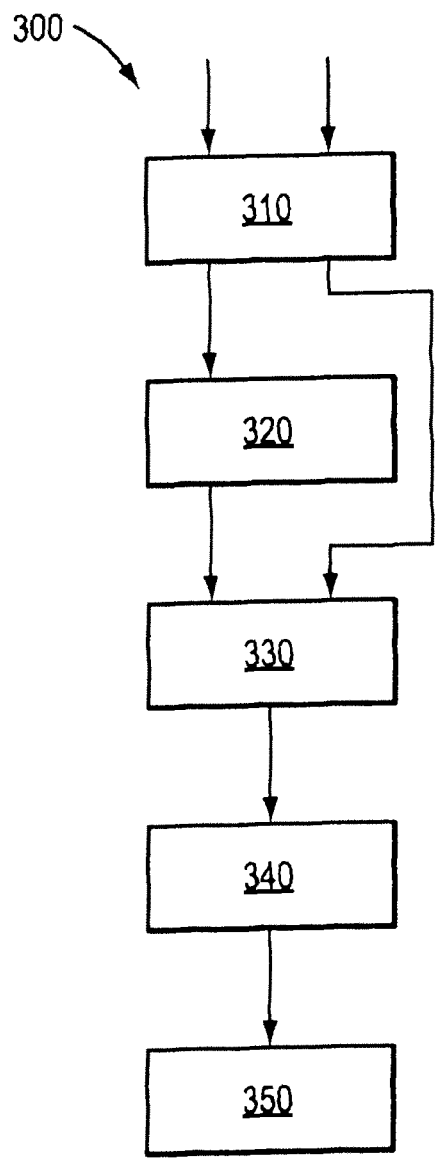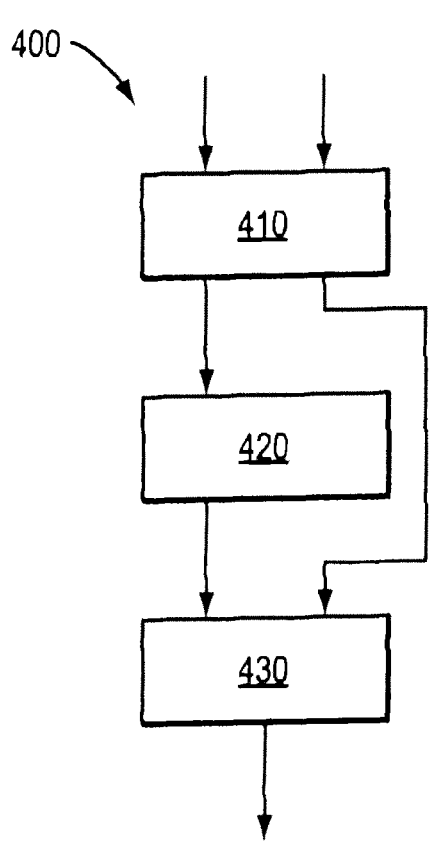
FIG. 3
FIG. 4

SYSTEM AND METHOD FOR MULTIPLEXING PDH AND PACKET DATA

CROSS-REFERENCE TO RELATED APPLICATION

The present application is a divisional application of and claims benefit to U.S. Nonprovisional patent application Ser. No. 11/032,078 filed Jan. 11, 2005 now U.S. Pat. No. 7,782, 812, and entitled "System and Method for Multiplexing PDH and Packet Data" which is incorporated herein by reference.

BACKGROUND

Digital transmission of signals has become widespread. To this end, a variety of digital transmission media are available which have different transmission characteristics and different information capacity. In order to make efficient use of the various transmission media, a hierarchy of transmission systems has been developed which operates at different transmission bit rates. In North America, the hierarchy includes the DS1 signal transmitted at 1.544 Mb/sec, the DS2 signal transmitted at 6.312 Mb/sec and the DS3 signal transmitted at 44.736 Mb/sec on multiple T1 channels. In Europe, a similar but different hierarchy includes multiple E1 channels transmitted at 2.048 Mb/sec.

The digital signals to be transmitted over a medium enter and leave the digital hierarchy by means of a signal conversion apparatus. In order to go from one digital transmission rate to a different digital transmission rate, one or more multiplexing steps may be required.

For high capacity transmission, it is desirable to efficiently combine or multiplex a plurality of one or more of the digital signals in the hierarchy without the need for intermediate multiplexer (demultiplexer) stages or a number of different multiplexing (demultiplexing) schemes. Additionally, it is equally desirable to efficiently add and/or drop one or more digital signals of one or more digital transmission bit rates without the need for multiple multiplexing and/or demultiplexing processes.

There are several known methods utilized to combine or multiplex digital signals such as Plesiochronous Digital Hierarchy (PDH), Synchronous Digital Hierarchy (SDH), and asynchronous data with packet data. Some methods include Asyncrhonous Transfer Mode (ATM) or mapping the signals into a Synchronous Optical Network (SONET) or an SDH frame. These methods are subject to several known problems. For example, in the asynchronous mode, ATM information may be transferred in standard-length 53-byte ATM cells. However, the payload transferred on the radio path does not usually measure 48 bytes, i.e. 384 bits, wherefore padding bits are needed. In addition, if the payload in a block on the radio path is longer than 48 bytes, the content of one block must be transmitted in several ATM cells. Thus, ATM mapping generally is not the most efficient method of utilizing bandwidth.

Another problem with ATM and SONET/SDH mapping is that the addition of padding bits and/or division of the payload between a plural number of cells adds to the processing of the information to be transferred when the transmission network is entered or exited. Such characteristics are undesirable in point-to-point radio applications which require efficient bandwidth utilization and low latency per link.

Thus, a need exists in the art to efficiently combine or multiplex digital signals, i.e., T1 or E1, having various digital hierarchies with packet or Ethernet signals for transmission as a single data stream. It is therefore an object of the present disclosure to provide a novel method of transmitting data in a communication system that is adapted to receive a first type of data having two data streams with different clocks and a second type of data. The novel method comprises the steps of receiving data from the first and second types of sources, providing a frame having plural bit positions, synchronizing the received first type of data thereby generating a synchronized data rate, assigning the synchronized first type of data in ones of the bit positions of the frame, distributing the second type of data in ones of the unassigned bit positions as a function of the synchronized data rate, and transmitting the frame.

It is a further object of the present disclosure to provide a novel method for transmitting communication signals in a predetermined frame format. The novel method comprises the steps of receiving data from a plurality of sources including a first and second type of data source, synchronizing the received first type of data source to thereby generate a synchronized data rate, and transmitting the synchronized first type of data and received second type of data in a predetermined frame format whereby the packet data is assigned in the predetermined frame format as a function of the synchronized data rate.

It is another object of the present disclosure to provide a novel method where data from plural PDH sources and from a packet source are received, assigned to bit positions in a frame, and transmitted as a single data stream whereby the data received from the packet source is arranged in the data stream as a function of a synchronized data rate of the received PDH sources.

It is still another object of the present disclosure to provide a novel method of combining data from plural first type of data sources and at least one second type of data source. The novel method comprises the steps of synchronizing the plural first type of data sources to thereby generate a synchronized data rate, providing a frame having plural bit positions, assigning the synchronized first type of data in ones of the bit positions of the frame, and arranging the second type of data in the frame as a function of the synchronized data rate to thereby combine data from different types of data sources.

It is an object of the present disclosure to provide a novel method of transmitting data received from plural sources that are not synchronized with each other and a packet source as a single data stream. The novel method comprises the steps of synchronizing data received from the plural sources that are not synchronized with each other to thereby generate a synchronized data rate, providing a frame format comprising a plurality of frames each frame having plural sub-frames the number of which correlates to the number of received plural sources that are not synchronized with each other and each sub-frame comprising a plurality of blocks, assigning the synchronized data and data received from the packet source in bit positions of the frame format, and transmitting the assigned data as a single data stream.

It is also an object of the present disclosure to provide a novel system where data from sources having different synchronisms and packet sources is transmitted in a frame format as a single data stream the improvement wherein the packet data is arranged in said data stream as a function of a data rate of said sources having different synchronisms.

These objects and other advantages of the disclosed subject matter will be readily apparent to one skilled in the art to which the disclosure pertains from a perusal of the claims, the appended drawings, and the following detailed description of the preferred embodiments.

BRIEF DESCRIPTION OF THE DRAWINGS

FIG. 3 is a representative flow chart for the operation of a communication system according to an embodiment of the present subject matter.

FIG. 4 is a representative flow chart for the operation of a communication system according to another embodiment of the present subject matter.

DETAILED DESCRIPTION

The present disclosure is generally directed to a one-step programmable data multiplex scheme to combine a mixture of standard Plesiochronous Digital Hierarchy (PDH), Synchronous Digital Hierarchy (SDH) and asynchronous data sources such as multiples of E1 and T1 data with packet data sources for transmission over a medium such as a radio link, cable, fiber or other suitable transmission medium.

Figure 1:
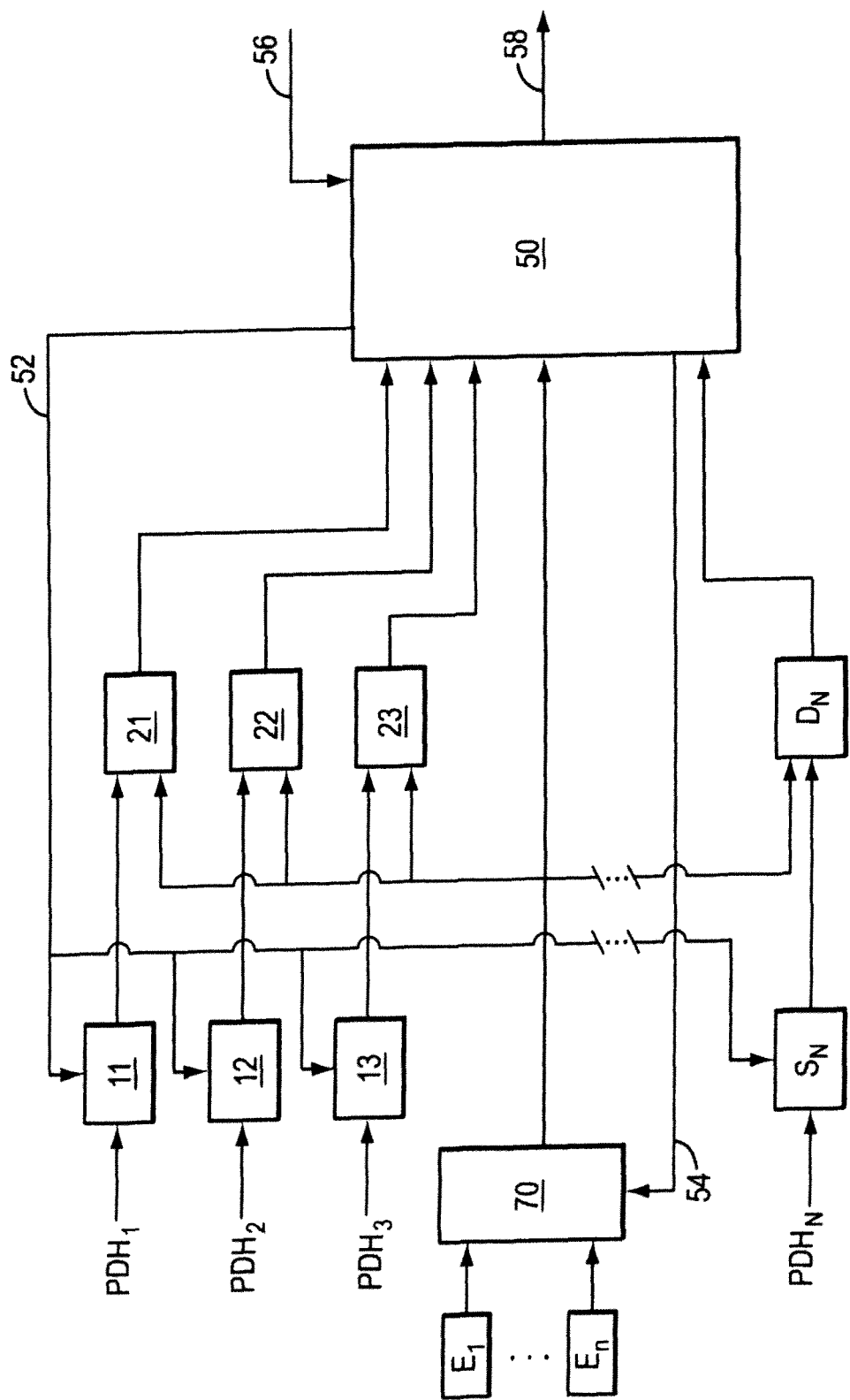
FIG. 1 is an illustration of a T1/E1 and Ethernet data multiplexer according to an embodiment of the present subject matter.

With reference to FIG. 1, an embodiment of the present disclosure is illustrated that enables flexible transmission of many different capacities of either mixed PDH data and packet data, all PDH data, or all packet data in a given payload capacity. No constraint exists on the embodiment illustrated in FIG. 1 with regard to the data received therein; PDH data is shown for exemplary purposes only and should not be construed to limit the disclosure. As shown, all PDH tributaries or sources $1, 2, 3, \ldots, N$ to be multiplexed in a predetermined frame format having plural sub-frames are synchronized by a synchronizer $11, 12, 13, \ldots, S.sub.N$. The synchronizers $11, 12, 13, \ldots, S.sub.N$ may be provided with a multiplex synchronous clock 52 or other known clock means to produce a synchronized data rate. Several known methods may be utilized to synchronize the PDH source data. For example, the PDH source data may be synchronized by positive bit stuffing. In an embodiment of the present disclosure, at least one stuffing opportunity may be assigned to each PDH data source per frame and the stuffing occurrence will be indicated through stuffing indication bits in its associated sub-frame. Thus, the stuffing opportunity for PDH.sub.1 is in sub-frame 1, and the stuffing opportunity for PDH.sub.2 is in sub-frame 2, and so on. When the maximum number of PDH data sources is less than that of the number of sub-frames, the number of stuffing opportunities for each PDH source per frame may be increased to improve the jitter performance of a communication system.

As shown in FIG. 1, Ethernet or packet data is received by multiple ports $E1, \ldots E.sub.N$ such as 10/100 Base-T ports or other suitable ports adapted to receive packet data. The ports $E1, \ldots E.sub.N$ provide the packet data to an Ethernet switch 70 or bridge (not shown). The Ethernet switch 70 may be provided with an Ethernet capacity clock 54 having an input from a multiplexer 50 or from another suitable clock means. The multiplexer 50 may also be provided with a clock source 56 from a master clock or other suitable means. The synchronized data from the plurality of PDH data sources are provided to a respective plurality of data selectors $21, 22, 23, \ldots D.sub.N$. Each data selector may also be provided with an input from the Ethernet switch 70 thereby providing a packet data input to the plurality of data selectors. It is also envisioned that multiple Ethernet switches may be utilized thereby providing multiple packet data inputs to the plurality of data selectors. The data selectors $21, 22, 23, \ldots, D.sub.N$ may be programmed by software to provide the multiplexer 50 with data from plural or select sources or exclude plural or select sources. Synchronized PDH data and packet data provided to the multiplexer 50 are arranged in the frame format in the multiplexer 50 which then provides a single data stream 58 for transmission over a medium. The packet data to be transmitted is arranged in the frame format to have an integer $t$ ($t=1, 2, 3, 4, \ldots$) multiple of the synchronized PDH data rate. Although the actual PDH source number to be multiplexed may be limited due to practical application purposes, the aggregate payload data rate of the transmitted single data stream 58 using the multiplexing scheme according to an embodiment of the present disclosure can be as low as 1T1 or 1 E1 to as high as over 100T1 or over 100E1 equivalent capacity.

Figure 2:
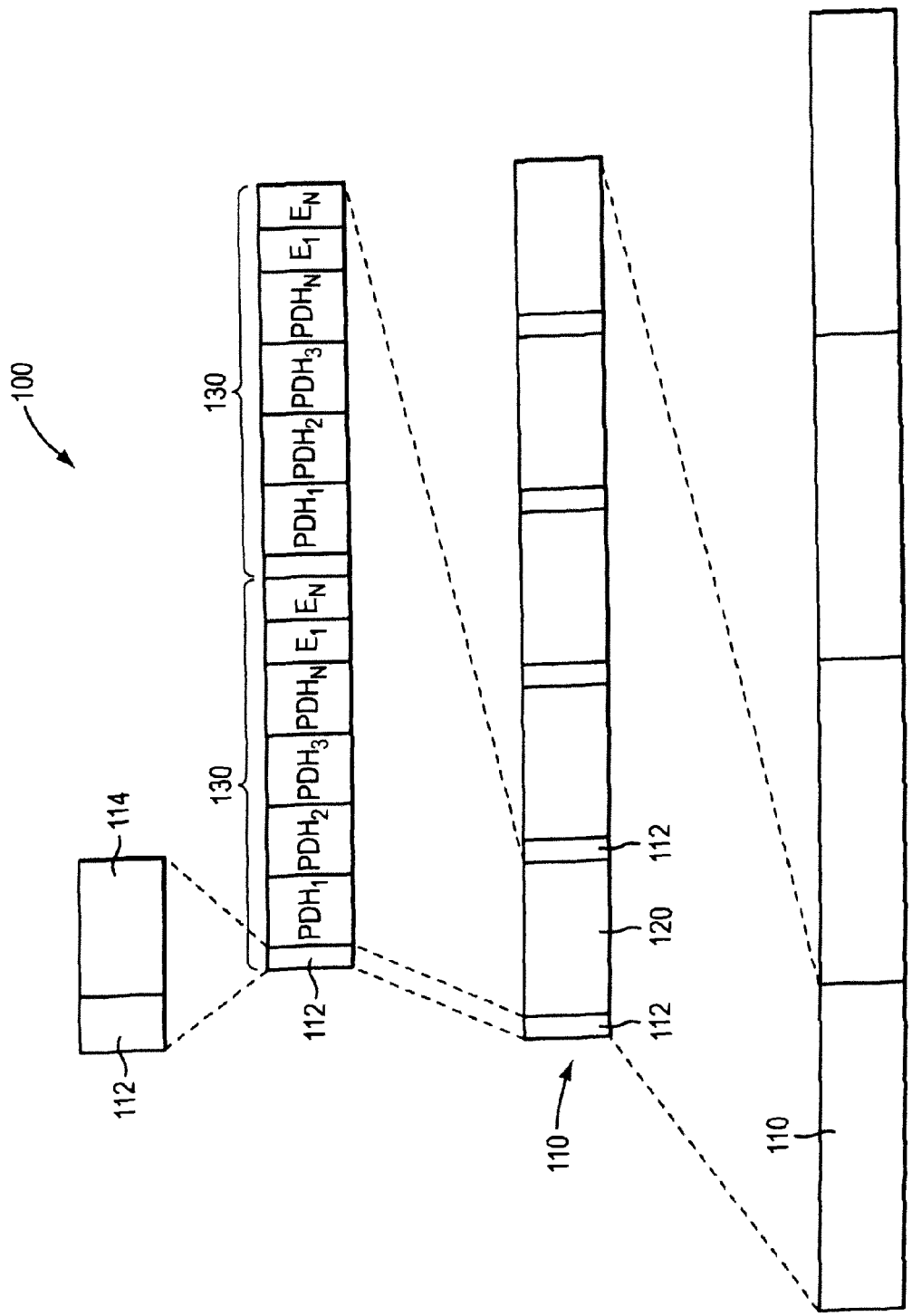
FIG. 2 is an illustration of an exemplary frame format according to an embodiment of the present subject matter.

With reference to FIG. 2, an embodiment of the frame format of the present disclosure comprises at least one frame 100 having plural sub-frames 110. Each sub-frame 110 comprises plural blocks 120 having a plurality of sub-blocks 130. As illustrated, each sub-block 130 includes one bit position for each synchronized PDH source and/or one bit position for the packet data that is equivalent to the synchronized data rate. Each block 120 within a sub-frame 110 includes n sub-blocks 130, one or more frame complementary overhead bit positions 112, n bit positions for synchronized data from each PDH source and (t*n) bit positions for packet data. Any of the n bit positions for the synchronized data from each PDH source may be filled with packet data if the bit positions are not provisioned to carry the synchronized PDH data. Thus, packet data to be multiplexed may occupy part of all of the bit positions for synchronized PDH data. The synchronized PDH data and/or packet data may also be sequentially bit interleaved in each block or arranged in the frame format by other known suitable sequencing means.

For systems having maximum N*PDH data sources with additional t*T1 or t*E1 equivalent packet data rate capacity, there will be n*(N+t) bit positions for synchronized PDH data and packet data per block. Thus, in the instance that the total mixed data capacity exceeds the capacity designated for the PDH data, additional capacity for packet data may be added in the increment of t (t=1, 2, 3, 4, . . . ) times the synchronized PDH (i.e., T1 or E1) rate. As discussed above, this is accomplished by adding (t*n) bits for the additional packet data per block in all the blocks of the frame.

As shown in FIG. 2, the frame complementary overhead bit positions 112 may contain auxiliary data to be transmitted with the main payload. This auxiliary data may be used to carry network management data, service channel data and other data. The frame complementary overhead bit positions 112 may also provide frame house keeping bits such as a Frame Alignment Word (FAW) 114, stuffing indication bits, parity bits and other known housekeeping bits. The stuffing indication bits, parity bits and other known housekeeping bits may be distributed throughout the frame in unused overhead bit positions 112.

To speed up frame acquisition time, bunched FAW (i.e., 11110110000101000) may be utilized. The FAW 114 would be arranged in the first block of the first sub-frame and the frame complementary overhead bit positions 112 designated for the FAW 114 in the sub-frames may be filled with synchronized PDH data bits and/or packet data bits. It is also envisioned that other housekeeping bits, such as parity bits may be utilized in overhead bit positions of the first sub-frame. The FAW 114 may also be distributed in the embodied frame format. In such an embodiment, the FAW bits are distributed in the complementary overhead bit positions 112.

The minimum number of sub-frames 110 required in the frame 100 depends on the maximum number of PDH sources received. For example, if the maximum number of PDH sources is 16, a minimum of 16 sub-frames 110 per frame 100 are used. The number of sub-blocks 130 per block 120 and the number of blocks 120 per sub-frame 110 are determined by the required capacity of the auxiliary data, the number of stuffing indication bits (C bits), the number of parity bits, the size of the frame (bits per frame) and/or the available bandwidth in the transmission medium.

With reference to FIG. 3, a representative flow chart is shown illustrating the operation of a communication system according to an embodiment of the present subject matter. A communication system 300 may be adapted to receive a first type of data having at least two data streams with different clocks and a second type of data from a first and second types of sources, as shown in Block 310. The system 300 synchronizes the received first type of data thereby generating a synchronized data rate, as shown in Block 320. A frame format is provided having plural bit positions, as shown in Block 330. The synchronized first type of data are assigned in ones of the bit positions of the frame while the second type of data are distributed in ones of the unassigned bit positions as a function of the synchronized data rate, as shown in Block 340. The system 300 then transmits the frame as shown in Block 350.

With reference to FIG. 4, a representative flow chart is shown illustrating for the operation of a communication system according to another embodiment of the present subject matter. A communication system 400 is adaptable to receive data from a plurality of sources including a first and second type of data source, as shown in Block 410. The received first type of data source is synchronized to thereby generate a synchronized data rate, as shown in Block 420. The synchronized first type of data and received second type of data is transmitted in a predetermined frame format whereby the packet data may be assigned in the predetermined frame format as a function of the synchronized data rate, as shown in Block 430.

While preferred embodiments of the disclosed system and method have been described, it is to be understood that the embodiments described are illustrative only and that the scope of the embodiments of the disclosed system and method are to be defined solely by the appended claims when accorded a full range of equivalence, many variations and modifications naturally occurring to those of skill in the art from a perusal hereof.

The invention claimed is:

1. A method of transmitting data received from plural sources that are not synchronized with each other and a packet source as a single data stream comprising the steps of:
   synchronizing data received from the plural sources that are not synchronized with each other to thereby generate a synchronized data rate;
   providing a frame format comprising a plurality of frames, each frame having plural sub-frames, the number of which correlates to the number of plural sources that are not synchronized with each other and each sub-frame comprising a plurality of blocks, each block comprising:
      at least one overhead bit position,
      n bit positions of the synchronized data,
      m bit positions of data received from the packet source arranged as a function of the synchronized data rate, and
      a plurality of sub-blocks each having a bit position for the synchronized data or a bit position for data received from the packet source;
   assigning the synchronized data and data received from the packet source in bit positions of the frame format; and
   transmitting the assigned data as a single data stream.

2. The method of claim 1 further comprising the step of filling unassigned bit positions with packet data.

3. The method of claim 1 further comprising the steps of:
   inserting a frame alignment word in bit positions of a first block of a first sub-frame; and
   distributing synchronized data bits or data bits received from the packet source in unassigned overhead bit positions of other blocks.

4. The method of claim 1 wherein the plural sources that are not synchronized with each other include at least one of synchronous, asynchronous, and plesiochronous sources.

5. The method of claim 1 further comprising the step of sequentially bit interleaving the synchronized data bits and data bits received from the packet source in the frame format.

6. The method of claim 1 wherein the data received from the plural sources that are not synchronized with each other are synchronized by bit stuffing.

7. The method of claim 1 further comprising the step of distributing stuffing indication bits in unassigned overhead bit positions.

8. The method of claim 1 further comprising the step of distributing parity bits in unassigned overhead bit positions.

9. A system for transmitting data received from plural sources that are not synchronized with each other and a packet source as a single data stream, the system comprising:
   means for synchronizing data received from the plural sources that are not synchronized with each other to thereby generate a synchronized data rate; and
   means for providing a frame format comprising a plurality of frames, each frame having plural sub-frames, the number of which correlates to the number of plural sources that are not synchronized with each other and each sub-frame comprising a plurality of blocks, each block comprising:
      at least one overhead bit position,
      n bit positions of the synchronized data,
      m bit positions of data received from the packet source arranged as a function of the synchronized data rate, and
      a plurality of sub-blocks each having a bit position for the synchronized data or a bit position for data received from the packet source;
   wherein the means for providing the frame format is further configured to assign the synchronized data and data received from the packet source in bit positions of the frame format; and
   wherein the means for providing the frame format is further configured to transmit the assigned data as a single data stream.

10. The system of claim 9 wherein the means for providing the frame format is further configured to fill unassigned bit positions with packet data.

11. The system of claim 9 wherein the means for providing the frame format is further configured to:
   insert a frame alignment word in bit positions of a first block of a first sub-frame; and
   distribute synchronized data bits or data bits received from the packet source in unassigned overhead bit positions of other blocks.

12. The system of claim 9 wherein the plural sources that are not synchronized with each other include at least one of synchronous, asynchronous, and plesiochronous sources.

13. The system of claim 9 wherein the means for providing the frame format is further configured to sequentially bit interleave the synchronized data bits and data bits received from the packet source in the frame format.

14. The system of claim 9 wherein the data received from the plural sources that are not synchronized with each other are synchronized by bit stuffing.

15. The system of claim 9 wherein the means for providing the frame format is further configured to distribute stuffing indication bits in unassigned overhead bit positions.

16. The system of claim 9 wherein the means for providing the frame format is further configured to distribute parity bits in unassigned overhead bit positions.

17. A system for transmitting data received from plural sources that are not synchronized with each other and a packet source as a single data stream, the system comprising:
    synchronizers configured to receive data from the plural sources that are not synchronized with each other to thereby generate a synchronized data rate; and
    a multiplexer configured to provide a frame format comprising a plurality of frames, each frame having plural sub-frames, the number of which correlates to the number of plural sources that are not synchronized with each other and each sub-frame comprising a plurality of blocks, each block comprising:
    at least one overhead bit position,
    n bit positions of the synchronized data,
    m bit positions of data received from the packet source arranged as a function of the synchronized data rate, and
    a plurality of sub-blocks each having a bit position for the synchronized data or a bit position for data received from the packet source;
    wherein the multiplexer is further configured to assign the synchronized data and data received from the packet source in bit positions of the frame format; and
    wherein the multiplexer is further configured to transmit the assigned data as a single data stream.

18. The system of claim 17 wherein the multiplexer is further configured to fill unassigned bit positions with packet data.

19. The system of claim 17 wherein the multiplexer is further configured to:
    insert a frame alignment word in bit positions of a first block of a first sub-frame, and
    distribute synchronized data bits or data bits received from the packet source in unassigned overhead bit positions of other blocks.

20. The system of claim 17 wherein the plural sources that are not synchronized with each other include at least one of synchronous, asynchronous, and plesiochronous sources.

21. The system of claim 17 wherein the multiplexer is further configured to distribute stuffing indication bits in unassigned overhead bit positions.

22. The system of claim 17 wherein the multiplexer is further configured to distribute parity bits in unassigned overhead bit positions.

* * * * *